United States Patent
Yang et al.

(10) Patent No.: US 10,036,305 B2
(45) Date of Patent: Jul. 31, 2018

(54) TURBOCHARGER HAVING COOLING ARRANGEMENT FOR COMPRESSOR AND METHOD THEREOF

(71) Applicant: Caterpillar Inc., Peoria, IL (US)

(72) Inventors: Nan Yang, Brimfield, IL (US); Robert C. Griffith, Chillicothe, IL (US); Arnold M. Kim, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 41 days.

(21) Appl. No.: 15/278,209

(22) Filed: Sep. 28, 2016

(65) Prior Publication Data

US 2018/0087448 A1 Mar. 29, 2018

(51) Int. Cl.
*F02B 29/04* (2006.01)
*F02B 33/40* (2006.01)
*F02M 21/02* (2006.01)

(52) U.S. Cl.
CPC .......... *F02B 29/0406* (2013.01); *F02B 33/40* (2013.01); *F02M 21/0215* (2013.01); *F02M 21/0248* (2013.01)

(58) Field of Classification Search
CPC . F02B 29/0406; F02B 33/40; F02M 21/0215; F02M 21/0248
See application file for complete search history.

(56) References Cited

U.S. PATENT DOCUMENTS

| | | | |
|---|---|---|---|
| 3,781,126 A | 12/1973 | Benisek | |
| 4,696,165 A | 9/1987 | Bucher | |
| 5,461,860 A | 10/1995 | Schegk | |
| 6,813,887 B2 | 11/2004 | Sumser et al. | |
| 7,021,058 B2 | 4/2006 | Scheinert | |
| 7,685,819 B2 | 3/2010 | Vetrovec | |
| 7,841,322 B2 | 11/2010 | Bach | |
| 7,980,081 B2 | 7/2011 | Mak | |
| 2009/0126691 A1* | 5/2009 | Bach | F02B 29/0418 123/480 |

* cited by examiner

*Primary Examiner* — Jacob Amick

(57) ABSTRACT

A method of cooling a compressor, providing compressed working fluid, in a natural gas based combustion engine is provided. The method includes diverting at least a portion of natural gas from a fuel tank of the combustion engine. The method further includes routing the portion of natural gas towards the compressor. The method also includes providing one or more nozzles disposed at one or more strategic locations of the compressor. The method further includes injecting the portion of natural gas, via the one or more nozzles, inside the compressor. The method also includes allowing the portion of natural gas to diffuse with the compressed working fluid inside the compressor in an endothermic expansion process, to convectively cool the compressor.

15 Claims, 10 Drawing Sheets

TURBOCHARGER HAVING COOLING ARRANGEMENT FOR COMPRESSOR AND METHOD THEREOF

TECHNICAL FIELD

The present disclosure relates to a turbocharger for a natural gas based combustion engine, and more particularly, to a method of cooling a compressor in a turbocharger of a natural gas based combustion engine.

BACKGROUND

In order to maximize power generated by an internal combustion engine, sometimes the engine may be equipped with a turbocharger. Typically, the turbocharger includes a compressor that compresses the air flowing into the engine. As the intake air is compressed by the compressor, the temperature of compressor body and its components, such as compressor wheel, may rise significantly. The materials used to construct the compressor are selected by consideration of cost and operating parameters. Traditionally, materials, including titanium alloys and the like, that can withstand higher operating temperatures are used to construct compressor components. However, such materials are relatively expensive, and usually are also difficult to machine. While an aluminum alloy based compressor is relatively cost beneficial and responds faster due to light weight and low inertia, it may be unsuitable for applications in which the compressed air temperature is or is expected to rise above a threshold value during operation.

U.S. Pat. No. 7,021,058, hereinafter referred to as the '058 patent, relates to a supercharging air compressor for an internal combustion engine, having a compressor wheel which is rotatably mounted in a compressor inlet duct, and to which combustion air can be fed via the compressor inlet duct. A partial stream of the compressed supercharging air is branched off downstream of the compressor wheel and is fed to a temperature reducing unit. The branched-off partial stream is fed, as cooling air, to a component of the supercharging air compressor after it has flowed through the temperature reducing unit. The proposed arrangement in the '058 patent may be able to cool the air compressor, however such an application requires employing a separate temperature reducing unit. This separate unit may add to the overall cost of the turbocharger assembly and may further need to withdraw power from the engine, which in turn, affects the engine's efficiency.

SUMMARY

In one aspect of the present disclosure, a method of cooling a compressor, providing compressed working fluid, in a natural gas based combustion engine is described. The method includes diverting at least a portion of natural gas from a fuel tank of the combustion engine. The method further includes routing the portion of natural gas towards the compressor. The method also includes providing one or more nozzles disposed at one or more strategic locations of the compressor. The method further includes injecting the portion of natural gas, via the one or more nozzles, inside the compressor. The method also includes allowing the portion of natural gas to diffuse with the compressed working fluid inside the compressor in an endothermic expansion process, to convectively cool the compressor.

In another aspect of the present disclosure, a turbocharger for a natural gas based combustion engine is described. The turbocharger includes a turbine, and a compressor associated with the turbine. The compressor is configured to provide a compressed working fluid to the combustion engine. The turbocharger also includes a fluid conduit connecting the compressor to a fuel tank of the combustion engine. The fluid conduit is configured to supply at least a portion of natural gas from the fuel tank to the compressor. The turbocharger further includes one or more nozzles operatively coupled with the compressor. The one or more nozzles are configured to inject the portion of natural gas inside the compressor.

In yet another aspect of the present disclosure, a method of assembling a turbocharger for a natural gas based combustion engine is described. The method includes providing a center housing. The method further includes installing a compressor onto the center housing. The method also includes providing a fluid conduit to connect the compressor to a fuel tank of the combustion engine. The fluid conduit is configured to supply at least a portion of natural gas from the fuel tank to the compressor. The method further includes installing one or more nozzles at one or more strategic locations of the compressor. The one or more nozzles are configured to inject the portion of natural gas inside the compressor.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
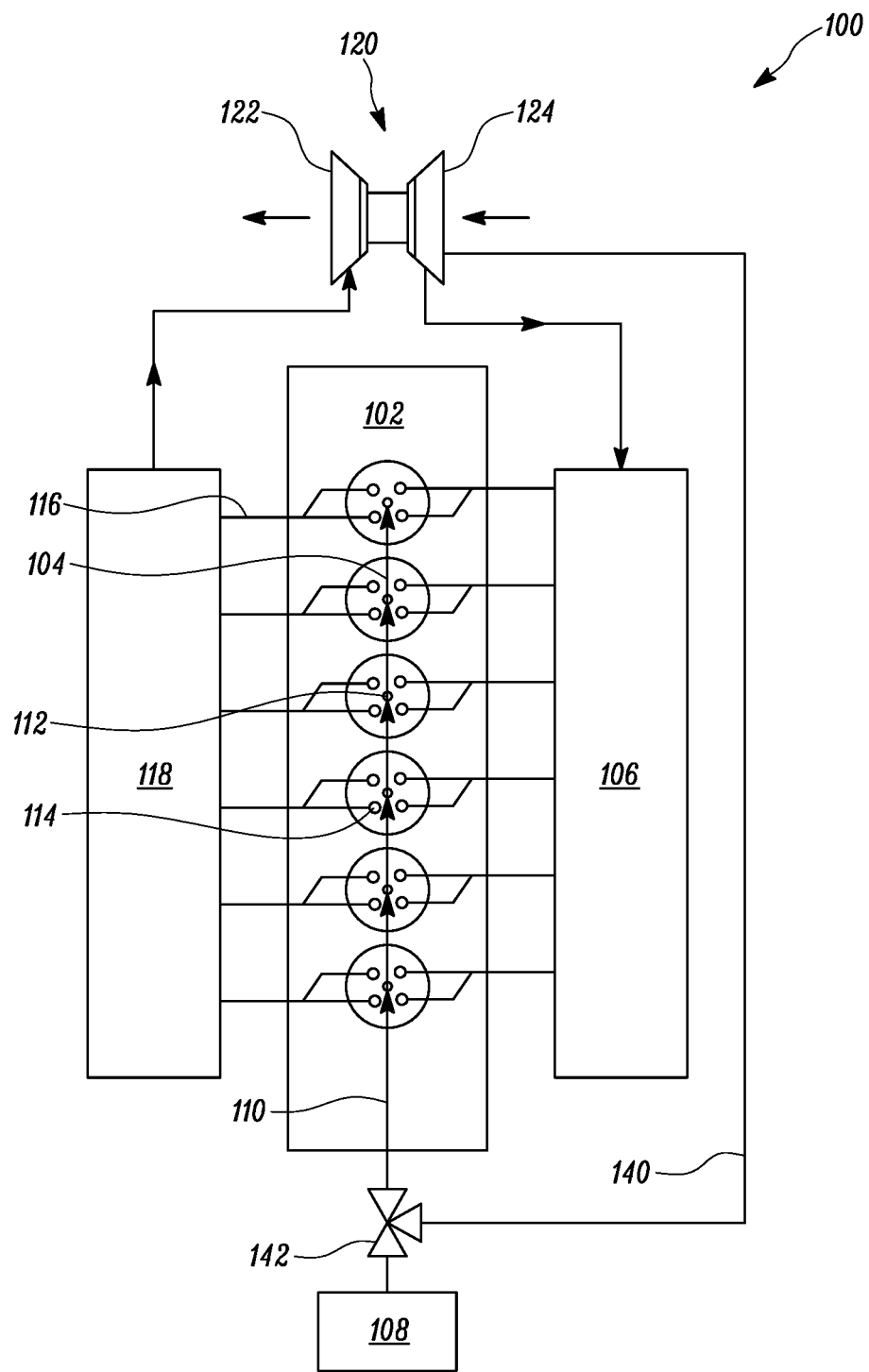
FIG. 1 illustrates a schematic diagram of a natural gas based combustion engine, in accordance with one or more embodiments of the present disclosure.

FIG. 1 illustrates a block diagram for an engine 100, in accordance with an embodiment of the present disclosure. The engine 100 may find applications in machines (not shown) such as, but not limited to, mining trucks, excavators, wheel loaders, or any heavy engineering machines, and furthermore in some stationary machines, such as generator or pump. The engine 100 may include a crankcase 102 that forms a plurality of cylinders 104. Although in FIG. 1, six cylinders 104 are shown in an inline arrangement, fewer or more cylinders arranged in a different configuration within the crankcase 102, for example in a V-configuration, may be used. Although not shown here, each cylinder 104 may include a reciprocating piston connected to a common crankshaft. It may be contemplated that in the engine 100, the combustion of a fuel and air mixture in the cylinders 104 generates motive power for the machine, and a resultant mixture of exhaust gas is produced in the known fashion.

The engine 100 may include an intake manifold 106, which is selectively in fluid communication with each cylinder 104 and provides compressed intake air to the cylinders 104. The engine 100 may include a fuel tank 108 to store suitable fuel for the engine 100. In an embodiment, the engine 100 may be a natural gas based combustion engine. Hereinafter, the terms "natural gas based combustion engine," "combustion engine" and "engine" have been interchangeably used without any limitations. The fuel tank 108 may be designed to store the natural gas in either a liquid form, such as Liquefied Natural Gas (LNG); or gaseous form, such as Compressed Natural Gas (CNG); or alternatively both forms at different times, for carrying combustion process in the engine 100. The fuel tank 108 may be connected to the cylinders 104 of the engine 100 via a supply line 110, for supply of the natural gas to the engine 100. In some examples, the engine 100 may include a vaporizer (not shown) to first convert the LNG into gaseous form before being supplied to the engine 100. The engine 100 may include multiple fuel injectors 112 associated with each of the cylinders 104 and disposed in fluid communication with the fuel tank 108 through the supply line 110 to receive the natural gas, and configured to inject the natural gas into the cylinders 104. The compressed air along with the natural gas provided to the cylinder 104 forms a combustible mixture that ignites when compressed or in the presence of a spark. Combustion byproducts are evacuated from each cylinder 104 through exhaust valves 114 and exhaust runners 116. The engine 100 may also include an exhaust manifold 118, which collects the exhaust gas from each cylinder 104. In the engine 100, the intake air in the intake manifold 106 as well as the released exhaust gas in the exhaust manifold 118, are under pressure. Hereinafter, the terms "intake air," "ambient air," "air" and "working fluid" have been interchangeably used without any limitations.

To provide the power used to compress the intake air, different engine applications may use one or more different devices. In an embodiment of the present disclosure, the engine 100 may include a turbocharger assembly 120 (also simply referred to as "turbocharger") to provide the compressed air to the intake manifold 106. As schematically illustrated in FIG. 1, the turbocharger assembly 120 may be fluidly connected to the exhaust manifold 118 and arranged to receive pressurized exhaust gas therefrom. Various types, sizes and numbers of turbochargers have been used with engines in the past. One design consideration when selecting an appropriate turbocharger for an engine application is the air flow rate and desired pressure ratio of engine intake air that is desired. It may be appreciated that the engine 100 may include more than one turbocharger assembly; for example, the engine 100 may implement staged compression of air utilizing two or more turbochargers. Moreover, one or more turbochargers may be replaced by a mechanically or electrically driven compressor or supercharger. Additionally, hybrid systems such as turbochargers with electrically, hydraulic or pneumatic assist mechanisms may be used.

Figure 2:
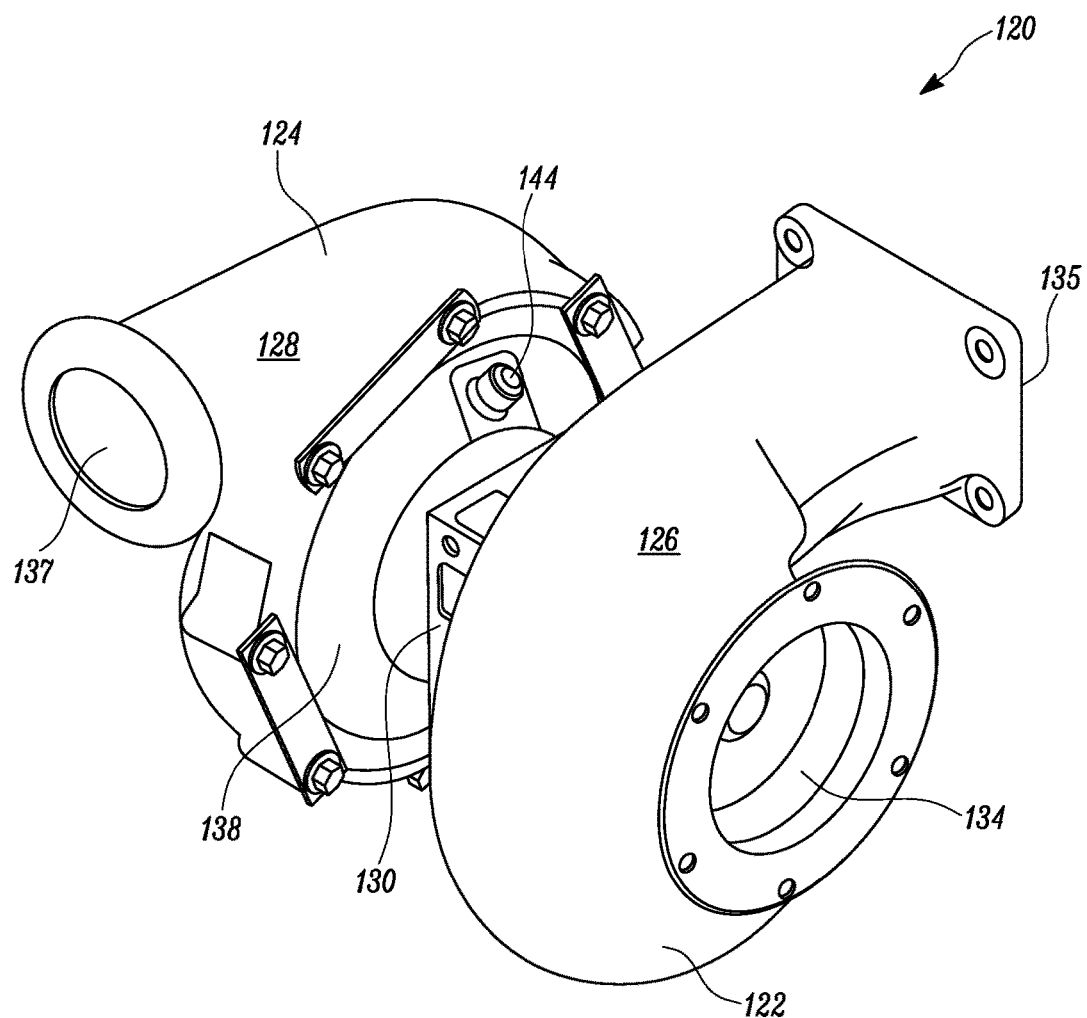
FIG. 2 illustrates a perspective view of a turbocharger assembly of the combustion engine, in accordance with one or more embodiments of the present disclosure.
Figure 3:
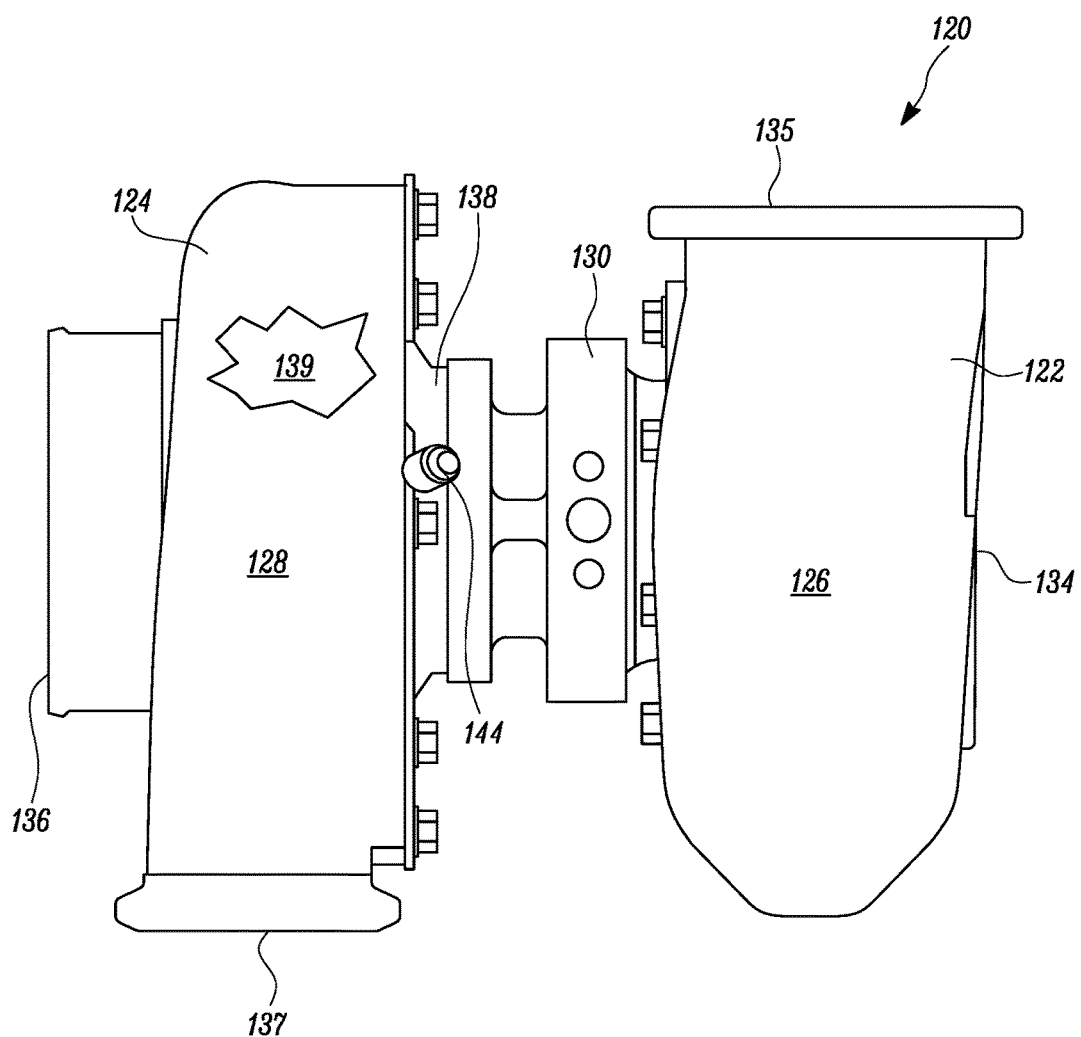
FIG. 3 illustrates a side planar view of the turbocharger assembly of FIG. 2, in accordance with one or more embodiments of the present disclosure.
Figure 4:
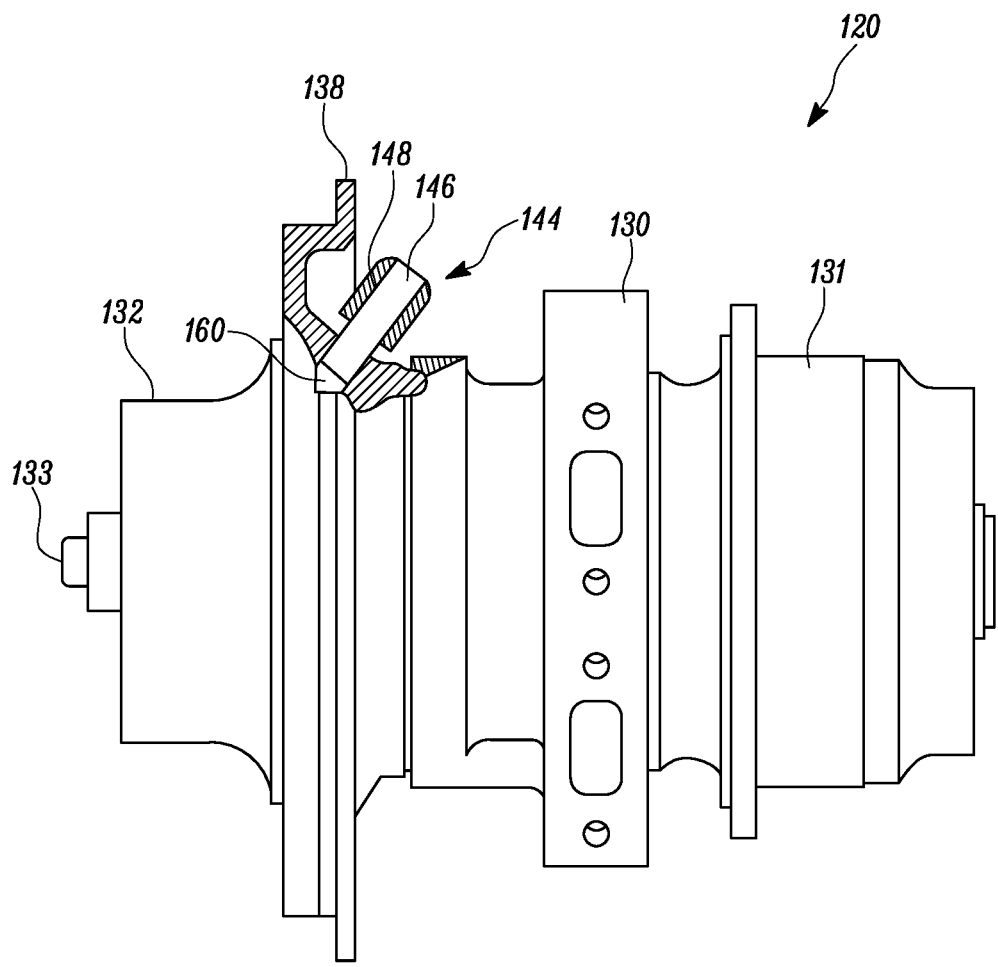
FIG. 4 illustrates a partial outline view of the turbocharger assembly of FIG. 2, in accordance with one or more embodiments of the present disclosure.

FIGS. 2-3 illustrate different views of the turbocharger assembly 120, according to different perspectives. The turbocharger assembly 120 may, generally, include a turbine 122 and a compressor 124. As illustrated, the turbine 122 and the compressor 124 may include a turbine housing 126 and a compressor housing 128, respectively. Further, the turbine housing 126 and the compressor housing 128 may be connected to each other by a center housing 130. FIG. 4 illustrates an outline view of the turbocharger assembly 120 with the turbine housing 126 and the compressor housing 128 removed to reveal their inner components. As may be seen from FIG. 4, the turbine 122 may include a turbine wheel 131 surrounded by the turbine housing 126, and the compressor 124 may include a compressor wheel 132 surrounded by the compressor housing 128. Both the turbine wheel 131 and the compressor wheel 132 may be connected to each other on opposite ends of a shaft 133. The shaft 133 may extend through the center housing 130 in the known fashion.

It may be contemplated that the turbine 122 may include an inlet 134 fluidly connected to the exhaust manifold 118, to receive exhaust gas during engine operation, where the exhaust gas operates to cause the turbine wheel 131 connected to the shaft 133 to rotate before exiting the turbine 122 through an outlet 135. The exhaust gas exiting the turbine 122 of the turbocharger assembly 120 may optionally be provided to exhaust treatment devices and systems (not shown) that mechanically and chemically removes combustion byproducts from the exhaust gas stream, and/or a muffler that dampens engine noise, before the exhaust gas is released into the environment. Similarly, the compressor 124 may include an inlet 136 to receive ambient air from the atmosphere, and an outlet 137 to supply the compressed intake air to the intake manifold 106 of the engine 100. It may be contemplated by a person skilled in the art that in the turbocharger assembly 120, the exhaust gas passes through a scrolled passage of the turbine 122 and impinges onto the turbine wheel 131 causing it to turn, rotating the shaft 133, which in turn operates the compressor wheel 132. The powered rotation of the compressor wheel 132 draws ambient air into the compressor housing 128 having a scrolled shape and compresses it. In some examples, the compressor 124 may include additional components, such as a fan (not shown) or the like, which aids with pulling the ambient air into the compressor 124.

When the compressor 124 is assembled, a back-plate 138 extends around the shaft 133 and is connected to the center housing 130 such that the compressor wheel 132 and the center housing 130 are on opposite sides of the back-plate 138. The back-plate 138 may be connected to the compressor housing 128 through fasteners, such as nut and bolts. The compressor housing 128 along with the back-plate 138 may enclose the compressor wheel 132, and define an interior space therebetween. The compressor housing 128 may also define an exducer section 139 proximal to where the compressed working fluid exits from the compressor wheel 132. It may be contemplated that the turbine 122 may also have a somewhat similar arrangement as that of the compressor 124, which is not described in detail herein for the brevity of the disclosure. Further, the center housing 130 may also include other structures, such as bearings, which are lubricated and which limit axial motion of the shaft 133 along its centerline due to thrust loadings on the turbine wheel 131 and the compressor wheel 132 during operation. In some examples, the center housing 130 may include an internal gallery (not shown) through which oil is provided via an oil supply opening, which may later be drained back to the crankcase 102 of the engine 100.

Referring to FIGS. 1-4 in combination, the turbocharger assembly 120 of the present disclosure may further include a fluid conduit 140 to supply at least a portion of natural gas from the fuel tank 108 to the compressor 124. In one example, the fluid conduit 140 may directly connect the compressor 124 of the turbocharger assembly 120 to the fuel tank 108 of the engine 100 (not shown in the drawings). In other example, as illustrated in FIG. 1, the turbocharger assembly 120 may include a diverter valve 142 which is a three-way valve disposed on the supply line 110 and further connected to the fluid conduit 140 from its one end, and configured to divert at least a portion of natural gas from the supply line 110 and route it towards the compressor 124. The compressor 124 may also include one or more connections 144 formed at some strategic locations therein, to allow attachment of the other end of the fluid conduit 140 and thereby receive the supply of the portion of natural gas. In the illustrated embodiment of FIGS. 2-4, only one connection 144 is shown, however it may be understood that the compressor 124 may include a plurality of connections 144, as will be described later. As may be seen, the connection 144 may define an internal passageway 146, with internal walls 148, extending into the compressor housing 128. In some examples, the fluid conduit 140 may include some custom fittings (not shown) formed at the other end to allow for attachment with the connections 144, in the compressor 124.

Figure 5:
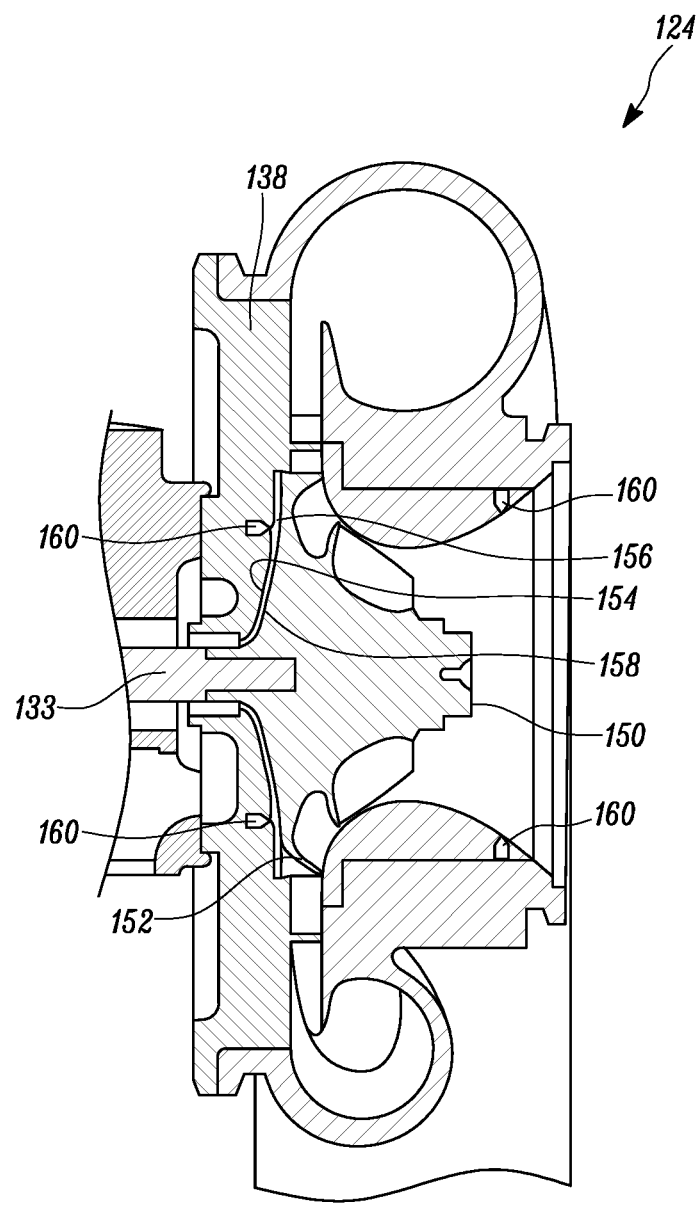
FIG. 5 illustrates a sectional view of a compressor of the turbocharger assembly, in accordance with one or more embodiments of the present disclosure.

As previously described, the back-plate 138 may be connected to the center housing 130 and disposed adjacent to the compressor wheel 132. As illustrated in the cross section of FIG. 5, the compressor wheel 132 may include a generally conical hub 150 that supports a plurality of radially extending blades 152. The hub 150 defines an inward-facing surface, referred to as base surface 154, which faces the back-plate 138. A radially extending cavity 156 is defined between the base surface 154 of the compressor wheel 132 and an inner surface 158 of the back-plate 138. As shown in FIG. 5, the cavity 156 may extend peripherally around the shaft 133 and is substantially exposed to outer peripheral portions of the base surface 154 of the compressor wheel 132. Further, the internal passageway 146 of the connection 144 may be fluidly open to the cavity 156 such that direct fluid communication is established between the fluid conduit 140 and the cavity 156.

In accordance with an embodiment of the present disclosure, the turbocharger assembly 120 may include one or more nozzles 160 operatively coupled with the compressor 124. The nozzles 160 may be sited in the internal walls 148 of the connections 144, in the compressor 124. The nozzles 160 may be disposed in fluid communication with the connections 144 to receive the portion of natural gas via the internal passageway 146, and configured to inject the portion of natural gas inside the compressor 124. The one or more nozzles 160, and thereby the connections 144, may be provided at some strategic locations in the compressor 124, for the purpose of injecting the portion of natural gas. In one example, the strategic location to position the nozzle 160 is one or more of the back-plate 138 and the exducer section 139, of the compressor 124. In the illustrated embodiments, the nozzles 160 are disposed at connections 144 provided in the back-plate 138 pointing towards the outlet 137 of the compressor 124, such that the portion of natural gas is injected in the exducer section 139 in a direction of flow of working fluid inside the compressor 124. Further, in one example, the strategic location to position the nozzle 160 is proximal to the inlet 136 of the compressor 124. In such example, the one or more nozzles 160 may be disposed proximal to the inlet 136 of the compressor 124 such that the portion of natural gas is injected in a direction of flow of working fluid into the compressor 124. For this purpose, the inlet 136 may be considered to be the section of the compressor 124 which is substantially close to the upstream of the compressor wheel 132. It may be understood that the connections 144 and the nozzles 160 may be designed to withstand high pressures of the CNG and/or low temperatures of the LNG, as the natural gas is supplied thereto.

Figure 6:
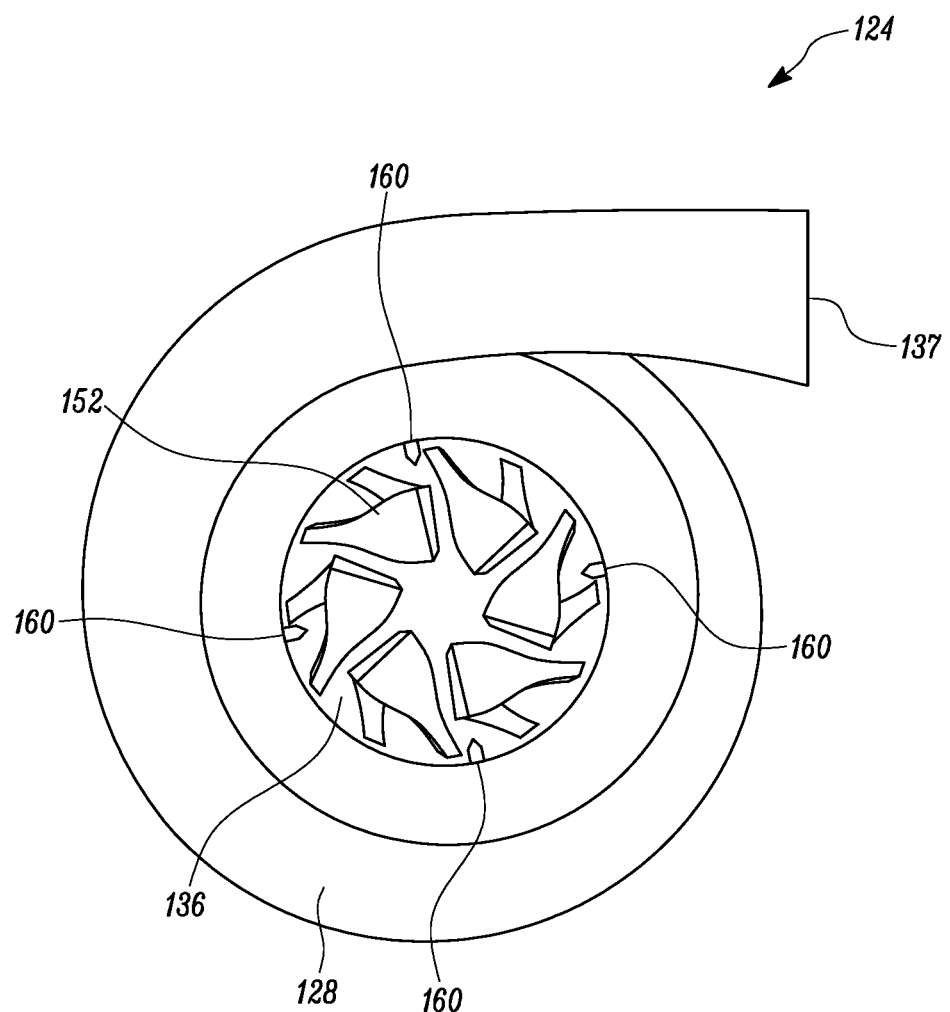
FIG. 6 illustrates a planar view of the compressor of FIG. 5, in accordance with one or more embodiments of the present disclosure.
Figure 7:
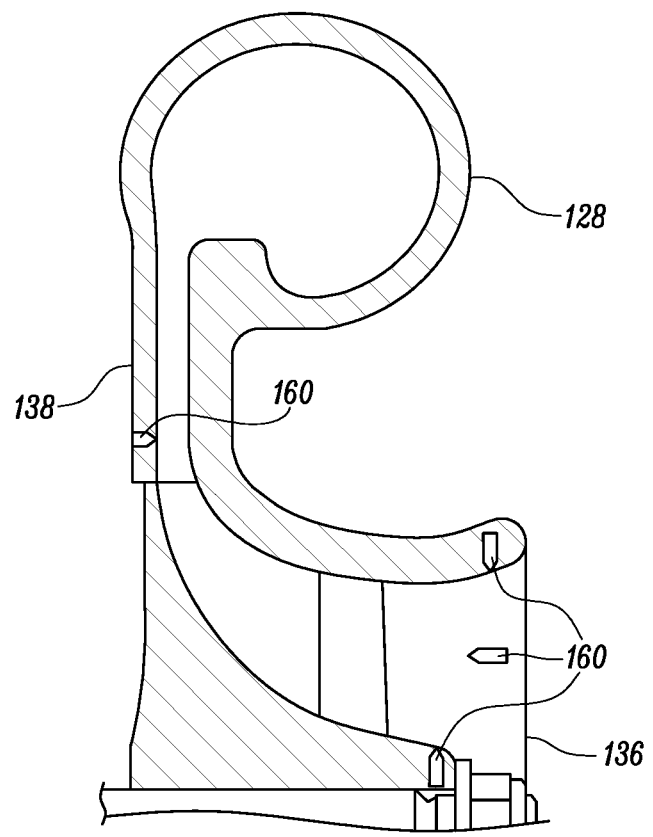
FIG. 7 illustrates a partial section view of the compressor of FIG. 5, in accordance with one or more embodiments of the present disclosure.

FIG. 6 illustrates a planar view of the compressor 124 from the side opposite to the back-plate 138. As illustrated, the compressor 124 is shown to include multiple connections 144 arranged around the periphery of the compressor wheel 132. In one embodiment, as representatively illustrated in FIG. 6, the nozzles 160, in the compressor 124, are arranged around the compressor wheel 132 in a ring shaped manner. That is, the nozzles 160 may be arranged along the radial periphery of the compressor wheel 132 at an outer diameter of the compressor housing 128 and/or the back-plate 138. For this purpose, a disk (not shown) having a plurality of apertures formed at regular annular intervals therein and with the nozzles 160 arranged in such apertures may be employed, and the disk may be disposed within the cavity 156. The ring shaped arrangement may direct the natural gas to impinge on targeted locations on the base surface 154 of the compressor wheel 132 that has been determined to be an area of high thermal stress, where such determination may be made empirically or numerically. Further, FIG. 7 illustrates a section of a portion of the compressor 124. In one embodiment, as illustrated therein, a plurality of discrete nozzles 160 may be disposed on one or both of the compressor housing 128 and the back-plate 138 to inject the portion of natural gas inside the interior space of the compressor housing 128. It may be understood that the configuration of the nozzles 160 and other components may vary as shown in various figures, without any limitations.

Figure 8:
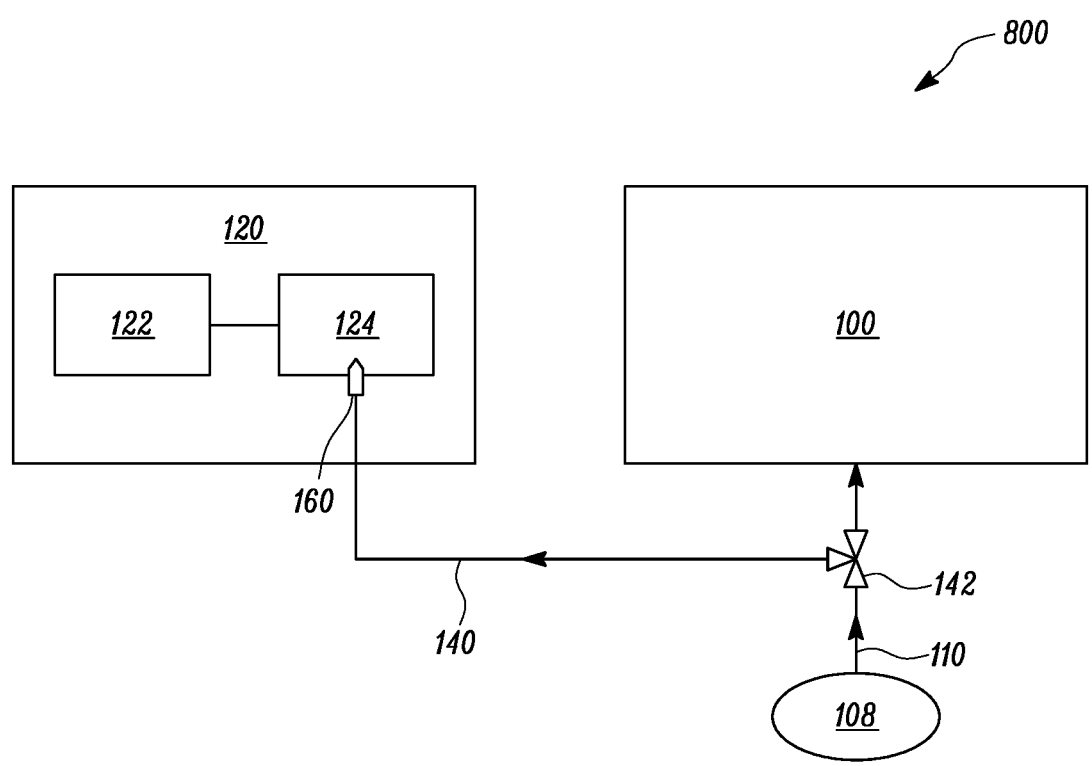
FIG. 8 illustrates a block diagram of a system for cooling the compressor, in accordance with one or more embodiments of the present disclosure.

FIG. 8 illustrates a high-level schematic for a cooling arrangement, generally referenced by the numeral 800, for cooling the compressor 124, in the turbocharger assembly 120. The cooling arrangement 800 may generally provide the fluid conduit 140 to connect the compressor 124 to be in fluid communication with the fuel tank 108. The cooling arrangement 800 may also provide the diverter valve 142 to divert at least a portion of natural gas from the fuel tank 108 towards the compressor 124. In some examples, the cooling arrangement 800 may include a controller (not shown) to control the diverter valve 142, for regulating the supply of natural gas to the compressor 124. The functioning of controller for regulating the fluid flow is well known in the art, and thus has not been described in detail herein. The cooling arrangement 800 may further provide one or more nozzles 160 disposed at one or more strategic locations in the compressor 124. The cooling arrangement 800 may configure the nozzles 160 to inject the portion of natural gas into the compressor 124. Usually, the natural gas is available for application either as CNG, which is typically 3600 psi; or as LNG, which is cryogenically stored at −160° C. The portion of natural gas when injected into the compressor 124 diffuse with the compressed working fluid inside the compressor 124 in an endothermic expansion process by Joule-Thomson effect, and thereby convectively cool the compressor 124.

INDUSTRIAL APPLICABILITY

Internal combustion engines are supplied with a mixture of air and fuel for combustion within the engine that generates mechanical power. To maximize the power generated by the combustion process, the engine is often equipped with a turbocharger. The turbocharger utilizes exhaust gas from the engine to compress intake air flowing into the engine, thereby forcing more air into a combustion chamber of the engine than a naturally-aspirated engine could otherwise draw into the combustion chamber. This increased supply of air provides increased volumetric efficiency, resulting in an increased engine power output. However, it may be contemplated that when turbocharger delivers high supercharging pressures, the compressor components experience high thermal loading and stresses. This may necessitate that such compressor components are either fabricated from high-temperature materials. For example, nowadays titanium based compressor wheels instead of aluminum based compressor wheels are typically used in the turbocharger because of high temperature capability of titanium alloy. However, such titanium alloys are expensive and moreover such compressor wheels are costly to manufacture as titanium alloys are difficult to machine and/or more hazardous to cast. Therefore, it may be desirable to cool the compressor, and thereby the compressor wheel so it may be reverted back to be formed of relatively lower cost aluminum based materials, which also have relatively faster response being lightweight.

Figure 9:
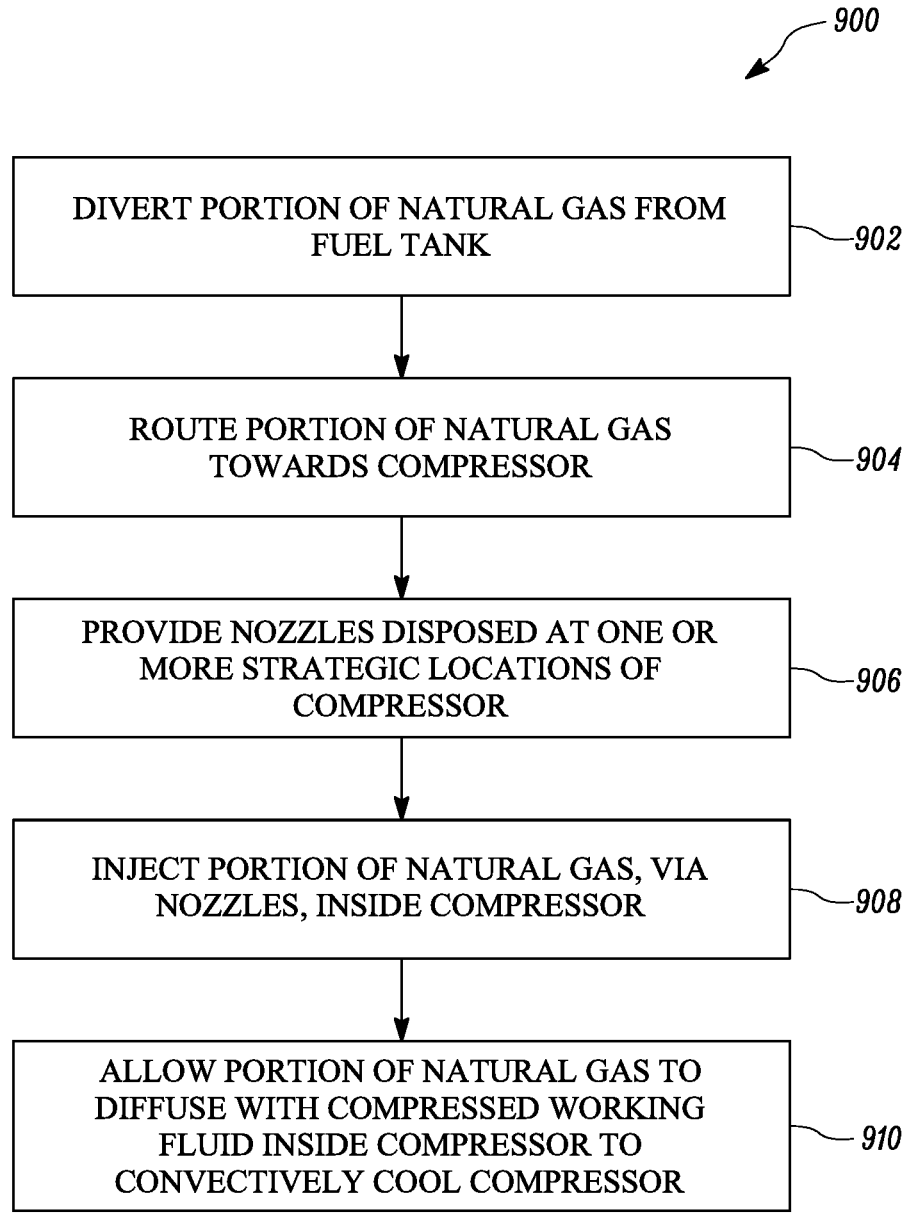
FIG. 9 illustrates a flowchart of method of cooling the compressor, in accordance with one or more embodiments of the present disclosure.

The present disclosure provides a method 900 for cooling the compressor 124 in a natural gas based combustion engine, such as the engine 100, as depicted in the form of a flowchart in FIG. 9. At step 902, the method 900 includes diverting at least a portion of natural gas from the fuel tank 108 of the engine 100, with or without using the diverter valve 142. At step 904, the method 900 includes routing the portion of natural gas towards the compressor 124, via the fluid line 140. At step 906, the method 900 includes providing one or more nozzles 160 disposed at one or more strategic locations of the compressor 124. At step 908, the method 900 includes injecting the portion of natural gas, via the one or more nozzles 160, inside the compressor 124. At step 910, the method 900 includes allowing the portion of natural gas to diffuse with the compressed working fluid inside the compressor 124 in an endothermic expansion process as a result of Joule-Thomson effect (JTE), and thereby convectively cool the compressor 124.

Figure 10:
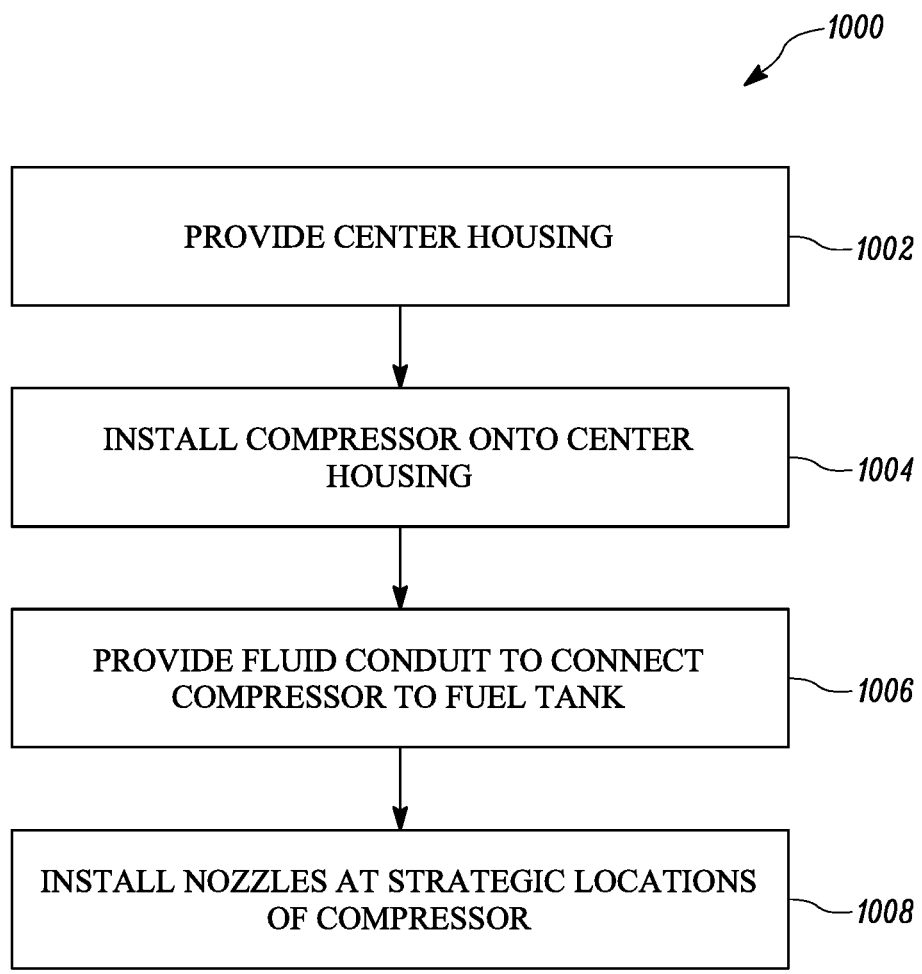
FIG. 10 illustrates a flowchart of method of assembling the compressor, in accordance with one or more embodiments of the present disclosure.

The present disclosure also provides a method 1000 of assembling the turbocharger assembly 120 for a natural gas based combustion engine, such as the engine 100, as depicted in the form of a flowchart in FIG. 10. At step 1002, the method 1000 includes providing the center housing 130. At step 1004, the method 1000 includes installing the compressor 124 onto the center housing 130. At step 1006, the method 1000 includes providing the fluid conduit 140 to connect the compressor 124 to the fuel tank 108 of the engine 100. At step 1008, the method 1000 further includes installing one or more nozzles 160 at one or more strategic locations of the compressor 124. Optionally, the method 1000 may include installing the one or more nozzles 160 at the back-plate 138 of the compressor 124. Optionally, the method 1000 may include installing the one or more nozzles 160 at the exducer section 139 of the compressor 124. Optionally, the method 1000 may include installing the one or more nozzles 160 proximal to the inlet 136 of the compressor housing 128. Optionally, the method 1000 may include arranging the nozzles 160 around the compressor wheel 132 in a ring shaped manner.

It is estimated that the temperature of the charged air inside the compressor 124 may be dropped by about 18 to 23° C., or an average of about 20° C., using the systems and methods of the present disclosure. The estimation is made based on following points: 1) The temperature of natural gas lowers by approximately 3.9° C. per 100 psi pressure drop. Since the CNG is stored at about 3600 psi, total pressure drop may lower natural gas temperature by approximately 140° C.; 2) The mass air to fuel ratio of natural gas in the engine 100 is usually about 17:1; and 3) The heat capacity of natural gas at atmosphere condition is approximately 2.34 KJ/Kg-K, and of air is approximately 1.0 KJ/Kg-K. Factoring these, it is possible to achieve a temperature drop of about 18 to 23° C. A temperature drop of 20° C. could enable an increase of compression ratio, e.g. from 6.2 to 6.8 at 74% compressor efficiency. Such magnitude of temperature drop of the charged air, and thereby the compressor wheel 132, may not only help to increase the volumetric efficiency, but also provide the possibility for certain applications to switch from using titanium based compressor wheels to using aluminum alloys based compressor wheels. It may be understood that the average temperature drop of about 20° C. is the overall average temperature drop assuming the gases are completely and uniformly mixed. However locally at or near the CNG injection locations, the temperature drop is expected to be much more severe. Thus if the injection locations are strategically selected at high temperature locations of the compressor wheels, it would generate sufficient local temperature drop to revert titanium based compressor wheels back to aluminum alloys based compressor wheels, such as aluminum alloy like FFM2618, and possibly even cast aluminum alloy like A354.

While aspects of the present disclosure have been particularly shown and described with reference to the embodiments above, it will be understood by those skilled in the art that various additional embodiments may be contemplated by the modification of the disclosed machines and assemblies without departing from the spirit and scope of what is disclosed. Such embodiments should be understood to fall within the scope of the present disclosure as determined based upon the claims and any equivalents thereof.

What is claimed is:

1. A method of cooling a compressor, providing compressed working fluid, in a natural gas based combustion engine, the method comprising:
    diverting at least a portion of natural gas from a fuel tank of the combustion engine;
    routing the portion of natural gas towards the compressor;
    providing one or more nozzles disposed at one or more strategic locations of the compressor;
    injecting the portion of natural gas, via the one or more nozzles, inside the compressor; and
    allowing the portion of natural gas to diffuse with the compressed working fluid inside the compressor in an endothermic expansion process, to convectively cool the compressor.

2. The method of claim 1, wherein the strategic location for injecting the portion of natural gas, is one or more of a back-plate, an exducer section and proximal to an inlet, of the compressor.

3. The method of claim 1, wherein the strategic location for injecting the portion of natural gas is a back-plate of the compressor, in a direction of flow of working fluid inside the compressor.

4. The method of claim 1, wherein the strategic location for injecting the portion of natural gas is an exducer section of the compressor, in a direction of flow of working fluid inside the compressor.

5. The method of claim 1, wherein the strategic location for injecting the portion of natural gas is proximal to an inlet of the compressor, in a direction of flow of working fluid into the compressor.

6. The method of claim 1, wherein providing one or more nozzles comprises arranging the nozzles around a compressor wheel of the compressor, in a ring shaped manner.

7. A turbocharger for a natural gas based combustion engine, the turbocharger comprising:
   a turbine;
   a compressor associated with the turbine and configured to provide a compressed working fluid to the combustion engine, wherein the compressor comprises a compressor housing having an inlet and radially surrounding a compressor wheel, and a back-plate connected to the compressor housing and enclosing the compressor wheel within an interior space of the compressor housing;
   a fluid conduit connecting the compressor to a fuel tank of the combustion engine and configured to supply at least a portion of natural gas from the fuel tank to the compressor; and
   one or more nozzles operatively coupled with the compressor and located at the back-plate of the compressor, at least one of the one or more nozzles configured to inject the portion of natural gas inside the compressor.

8. The turbocharger of claim 7, wherein the compressor housing defines an exducer section proximal to where the compressed working fluid exits from the compressor wheel, and wherein the portion of natural gas is injected in the interior space of the compressor housing.

9. The turbocharger of claim 8, wherein at least one of the one or more nozzles are located at the exducer section of the compressor.

10. The turbocharger of claim 8, wherein at least one of the one or more nozzles are located proximal to the inlet of the compressor housing.

11. The turbocharger of claim 8, wherein the nozzles are arranged around the compressor wheel in a ring shaped manner.

12. A method of assembling a turbocharger for a natural gas based combustion engine, the method comprising:
    providing a center housing;
    installing a compressor onto the center housing;
    providing a fluid conduit to connect the compressor to a fuel tank of the combustion engine, the fluid conduit configured to supply at least a portion of natural gas from the fuel tank to the compressor;
    installing one or more nozzles at one or more strategic locations of the compressor, the one or more nozzles configured to inject the portion of natural gas inside the compressor;
    providing a compressor housing to radially surround a compressor wheel of the compressor, the compressor housing having an inlet and defining an exducer section proximal to where working fluid exits from the compressor wheel inside thereof; and
    connecting a back-plate to the compressor housing to enclose the compressor wheel within an interior space of the compressor housing, wherein at least one of the one or more nozzles are installed at the back-plate to the compressor.

13. The method of claim 12 further comprising, installing at least one of the one or more nozzles at the exducer section of the compressor.

14. The method of claim 12 further comprising, installing at least one of the one or more nozzles proximal to the inlet of the compressor housing.

15. The method of claim 12 further comprising, arranging the nozzles around the compressor wheel in a ring shaped manner.

* * * * *